(12) United States Patent
Takeuchi

(10) Patent No.: US 8,243,348 B2
(45) Date of Patent: Aug. 14, 2012

(54) IMAGE PROCESSING APPARATUS AND METHOD AND COMPUTER PROGRAM PRODUCT FOR CONTROLLING THE SAME

(75) Inventor: Hiroaki Takeuchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 350 days.

(21) Appl. No.: 12/585,277

(22) Filed: Sep. 10, 2009

(65) Prior Publication Data

US 2010/0060953 A1  Mar. 11, 2010

(30) Foreign Application Priority Data

Sep. 11, 2008  (JP) ................................. 2008-233435
Jul. 17, 2009  (JP) ................................. 2009-168994

(51) Int. Cl.
*H04N 1/04* (2006.01)
(52) U.S. Cl. .......... 358/474; 358/448; 358/1.3; 358/505
(58) Field of Classification Search .................. 358/474, 358/448, 1.3, 505
See application file for complete search history.

(56) References Cited

U.S. PATENT DOCUMENTS

| 6,075,547 A | 6/2000 | Takeuchi |
| 2003/0227637 A1* | 12/2003 | Tanaka ........................... 358/1.3 |
| 2006/0215288 A1 | 9/2006 | Takeuchi |
| 2007/0146816 A1* | 6/2007 | Aoki ............................. 358/474 |

FOREIGN PATENT DOCUMENTS

| JP | 2001-57634 | 2/2001 |
| JP | 2006-325260 | 11/2006 |

* cited by examiner

*Primary Examiner* — Houshang Safaipour
(74) *Attorney, Agent, or Firm* — Harness, Dickey & Pierce, P.L.C.

(57) ABSTRACT

A scanner-characteristic correcting unit converts read image data into normalized image data. A first image processing unit applies a first image processing on the normalized image data. A color determining unit performs a color determination of the normalized image data. A controller image processing unit that applies a second image processing on the normalized image data is provided in a removable manner. When a B&W plotter unit is connected to an image processing apparatus without the controller image processing unit, the first image processing unit generates binary image data of the image data before a result of the color determination is output.

12 Claims, 12 Drawing Sheets

IMAGE PROCESSING APPARATUS AND METHOD AND COMPUTER PROGRAM PRODUCT FOR CONTROLLING THE SAME

CROSS-REFERENCE TO RELATED APPLICATIONS

The present application claims priority to and incorporates by reference the entire contents of Japanese Patent Application No. 2008-233435 filed in Japan on Sep. 11, 2008 and Japanese Patent Application No. 2009-168994 filed in Japan on Jul. 17, 2009.

BACKGROUND OF THE INVENTION

1. Field of the Invention

The present invention relates to an image processing apparatus to which is connected a scanner unit that reads an image of an original and to which is also connected either a color plotter unit that records/outputs a color image or a black-and-white plotter unit that records/outputs a black-and-white image, and further relates to a method and a computer program product for controlling the image processing apparatus.

2. Description of the Related Art

To meet a wide range of user needs that depend on the intended use, there have been developed various types of image forming apparatuses that have the functions of a copier, a printer, and a facsimile machine, so called multifunction printers (MFPs), ranging from inexpensive and unsophisticated to high speed and sophisticated.

An MFP necessarily includes an image processing apparatus that has a scanner function, an image processing function, an output function, and the like. If a sophisticated image processing apparatus is used, the cost of the MFP is increased. If the sophisticated and unsophisticated MFPs are configured to have totally different functions in order to cut the cost, the function extensibility expected of an MFP in recent years cannot be achieved.

To solve the above problems, for example, Japanese Patent Application Laid-open No. 2006-325260 discloses a technology that an image processing apparatus including a scanner function and an accumulation function is added to an image forming apparatus that has a plotter function. Image data of an original read by the scanner function is temporarily accumulated using the image-data accumulation function so that the processing speed can be increased and so that it is possible to provide an inexpensive image forming apparatus that has a copier function.

Such conventional technology can expand a single-function image forming apparatus, such as a printer, into a multi-function image forming apparatus, i.e., an MFP; however, it is not possible to make a low-cost MFP without an image-data accumulation function.

On the other hand, there are various types of black-and-white multifunction printers equipped with a color scanner ranging from inexpensive ones that have low productivity to expensive ones that have high productivity. A function of such black-and-white multifunction printers equipped with a color scanner is a link copy function for causing a plurality of MFPs to output an image scanned by the color scanner. By the use of the link copy function, high-speed bulk printing of an image can be achieved. However, the link copy function is a function of expensive MFPs equipped with a color scanner that have high productivity. In other words, high productivity is realized by the use of the link copy function. Therefore, it is necessary to cope with a case where the productivity is not required to be so high or a case where the productivity is enhanced even a little when there is no MFP that has high productivity.

SUMMARY OF THE INVENTION

It is an object of the present invention to at least partially solve the problems in the conventional technology.

According to one aspect of the present invention, there is provided an image processing apparatus to which a scanner unit that reads an image of an original and either one of a color plotter unit that records a color image and a black-and-white plotter unit that records a black-and-white image are configured to be connected. The image processing apparatus includes: a scanner-characteristic correcting unit that converts image data read by the scanner unit into normalized image data to compensate for a characteristic of the scanner unit; a first image processing unit that applies a first image processing on the normalized image data to generate image data to be output; a color determining unit that determines whether the normalized image data is color image data or black-and-white image data; and an attaching and removing unit that can attach and remove a controller image processing unit that applies a second image processing on the normalized image data to generate image data to be output. When the black-and-white plotter unit is connected to the image processing apparatus and the controller image processing unit is not attached, the first image processing unit generates binary image data of the image data by applying the first image processing on the normalized image data before a result of color determination of the image data by the color determining unit is output.

Furthermore, according to another aspect of the present invention, there is provided a method of controlling an image processing apparatus to which a scanner unit that reads an image of an original and either one of a color plotter unit that records a color image and a black-and-white plotter unit that records a black-and-white image are configured to be connected. The method includes: converting image data read by the scanner unit into normalized image data to compensate for a characteristic of the scanner unit; first image processing including applying a first image processing on the normalized image data to generate image data to be output; determining whether the normalized image data is color image data or black-and-white image data; and attaching a controller image processing unit that applies a second image processing on the normalized image data to generate image data to be output in a removable manner. When the black-and-white plotter unit is connected to the image processing apparatus and the controller image processing unit is not attached, the first image processing includes generating binary image data of the image data by applying the first image processing on the normalized image data before a result of color determination of the image data is output.

Moreover, according to still another aspect of the present invention, there is provided a computer program product that includes a computer-usable medium having computer-readable program codes embodied in the medium for implementing a method of controlling an image processing apparatus to which a scanner unit that reads an image of an original and either one of a color plotter unit that records a color image and a black-and-white plotter unit that records a black-and-white image are configured to be connected. The program codes when executed cause a computer to execute: converting image data read by the scanner unit into normalized image data to compensate for a characteristic of the scanner unit; first image processing including applying a first image processing on the normalized image data to generate image data to be output; determining whether the normalized image data is color image data or black-and-white image data; and attaching a controller image processing unit that applies a second image processing on the normalized image data to generate image data to be output in a removable manner. When the black-and-white plotter unit is connected to the image processing apparatus and the controller image processing unit is not attached, the first image processing includes generating binary image data of the image data by applying the first image processing on the normalized image data before a result of color determination of the image data is output.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
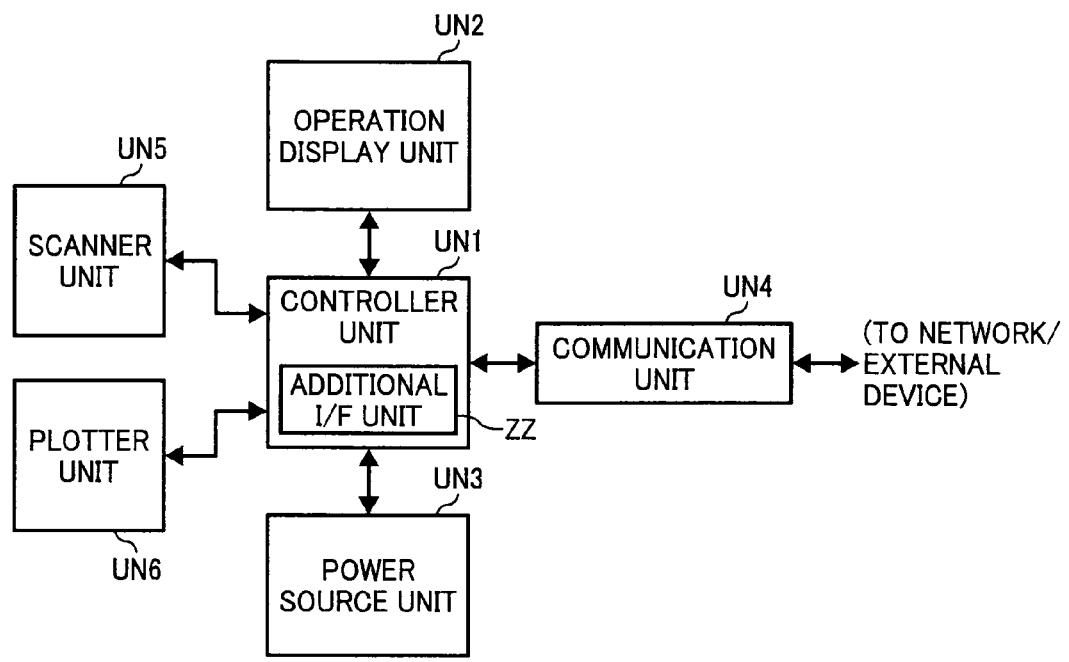
FIG. 1 is a block diagram of an example of an image forming apparatus according to an embodiment of the present invention.

FIG. 1 illustrates an example of an image forming apparatus including an image processing apparatus according to an embodiment of the present invention.

The image forming apparatus includes a controller unit UN1 that controls the operation of each of units composing the apparatus; an operation display unit UN2 that composes a user I/F for a user to operate the image forming apparatus; a power source unit UN3 that supplies power to each of the units of the image forming apparatus; a communication unit UN4 that is connected to an external device or a network, and exchanges various information with the connected external device or other terminal devices connected via the network; a scanner unit UN5 that reads an image of an original, and generates image data of the image; and a plotter unit UN6 that records/outputs a copy image, a print image, or the like on a recording sheet.

Of the units composing the image forming apparatus, the scanner unit UN5 and the plotter unit UN6 are configured to be removable from the image forming apparatus. The scanner unit UN5 and the plotter unit UN6 can be replaced with any of different types of scanner units and plotter units as long as they meet a predetermined I/F specification (for example, there are an I/F specification defining a physical requirement and an I/F specification defining a requirement of an signal input/output). For example, as the types of the scanner unit UN5, there are a scanner unit including an automatic document feeder (ADF), a scanner unit including a black-and-white reading function, a scanner unit including a color reading function, and the like. As the types of the plotter unit UN6, there are a plotter unit including a recording-sheet post-processing function (such as a sort function, a staple function, and a fold function), a plotter unit including a black-and-white print function, a plotter unit including a color print function, and the like.

Similarly, as for the communication unit UN4, any one can be selected from different types of communication units depending on a configuration of the image forming apparatus, and connected as the communication unit UN4 to the image forming apparatus. For example, as types of the communication unit UN4, there are a communication unit including a host I/F for connecting the image forming apparatus to a host device such as a personal computer device and a network I/F for connecting the image forming apparatus to a network, a communication unit including the host I/F only, and a communication unit including an I/F for connecting the image forming apparatus to another image forming apparatus for link printing (to be described later). Any one selected can be arbitrarily attached to the image forming apparatus. Furthermore, depending on the configuration of the image forming apparatus, the communication unit UN4 is sometimes not attached to the image forming apparatus (a so-called stand-alone configuration (such as a copier)).

For example, when the scanner unit UN5 and the plotter unit UN6 are both connected to the image forming apparatus, it is possible to achieve the image forming apparatus including a copier function, a printer function, a network printer function, a network facsimile-machine function, a network scanner function, and the like. In this case, depending on the functions included in the image forming apparatus, a communication unit having an appropriate function is connected as the communication unit UN4 to the image forming apparatus.

Furthermore, when only the plotter unit UN6 is connected to the image forming apparatus, it is possible to achieve the image forming apparatus having the printer function and the network printer function. In this case also, similarly, depending on the functions included in the image forming apparatus, a communication unit having an appropriate function is connected as the communication unit UN4 to the image forming apparatus.

The controller unit UN1 shall include an additional I/F unit ZZ to which an option board can be connected. When an option board is attached to the additional I/F unit ZZ, a function included in the option board enables image processing or the like. In the present embodiment, an option board equipped with a controller image processing unit shall be attached to the additional I/F unit ZZ.

Figure 2:
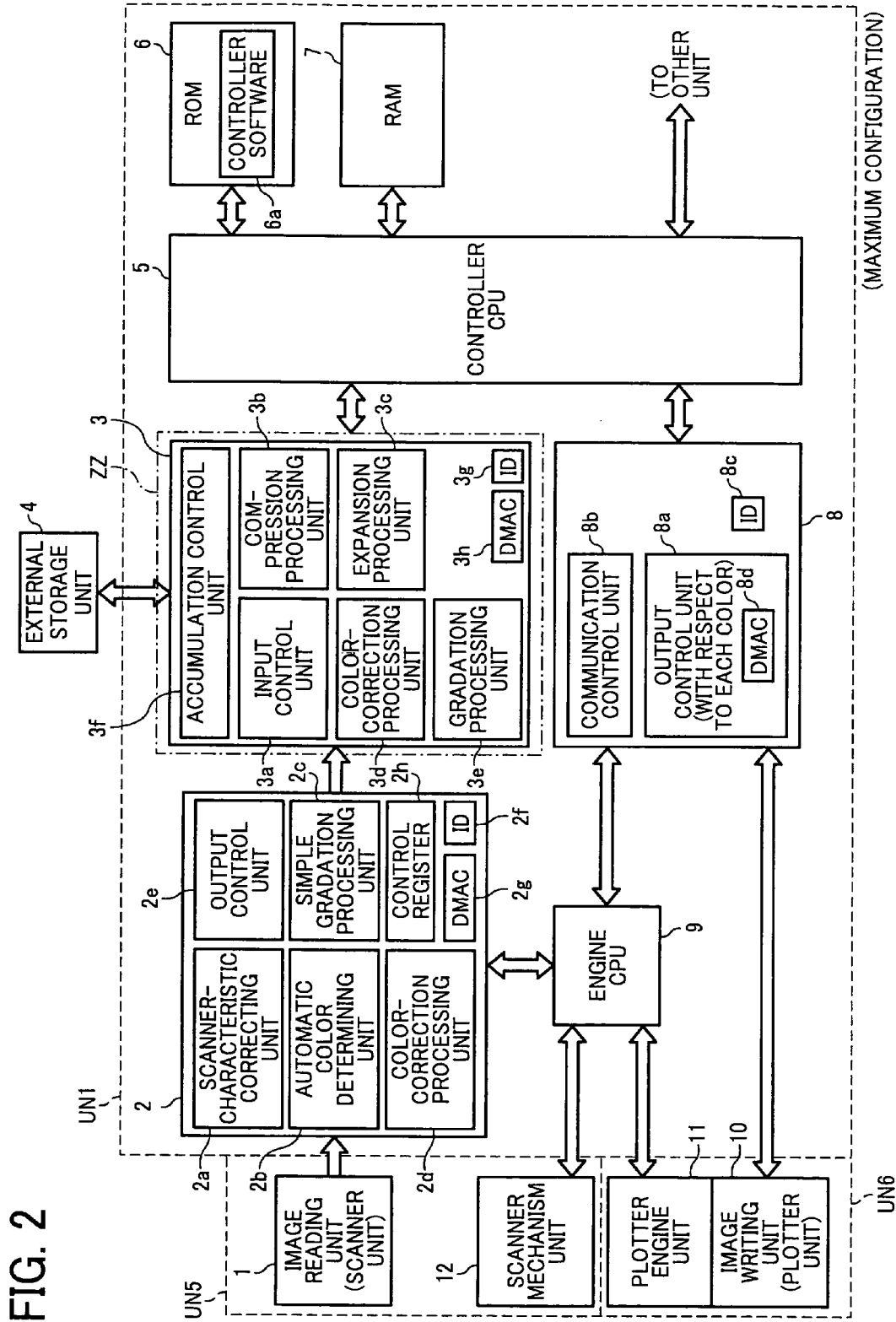
FIG. 2 is a block diagram illustrating an example of a maximum configuration of the image forming apparatus.

FIG. 2 illustrates a schematic configuration of the controller unit UN1 in the image forming apparatus to which the scanner unit UN5 and the plotter unit UN6 are both connected, particularly a configuration example of a portion of the controller unit UN1 that performs image processing. Hereinafter, such a configuration is referred to as "a maximum configuration".

As shown in FIG. 2, an image reading unit 1 of the scanner unit UN5 outputs image data to a scanner image processing unit 2. The scanner image processing unit 2 includes a scanner-characteristic correcting unit 2a, an automatic color determining unit 2b, a color-correction processing unit 2d, a simple gradation processing unit 2c, an output control unit 2e, a register 2f, and a direct memory access controller (DMAC) 2g. The scanner-characteristic correcting unit 2a converts the received image data into normalized image data. The automatic color determining unit 2b determines whether an original image is a color image or a black-and-white image based on the corrected image data output from the scanner-characteristic correcting unit 2a. The color-correction processing unit 2d performs color conversion of the image data depending on an output format. For example, the color-correction processing unit 2d mainly converts input red-green-blue (RGB) image data into output RGB image data or black-and-white image data. The simple gradation processing unit 2c performs a simple gradation process (a well-known process). The output control unit 2e outputs data from the scanner image processing unit 2 to a next stage. The register 2f stores therein identification data (ID) to be referred by a controller CPU 5 to be described later when the controller CPU 5 checks the configuration and characteristics of the scanner image processing unit 2. The DMAC 2g is provided for data transfer to a next stage.

The DMAC 2g outputs the image data processed by the scanner image processing unit 2 to the next stage. In the present embodiment, the next stage is a controller image processing unit 3, the controller CPU 5, or other units via the controller CPU 5. When an output destination (an address) is set by the controller CPU 5 or an engine CPU 9, the DMAC 2g performs a process for outputting the image data to the output destination.

Image processing performed by the scanner-characteristic correcting unit 2a (i.e., a conversion process of the image data into normalized image data) is, for example, a shading correction, a gamma transformation, a filtering process, a color conversion, or the like. In this case, the color conversion is not an RGB to cyan-magenta-yellow-black (CMYK) conversion but an RGB to RGB conversion. The color conversion is performed mainly to adjust fluctuations in image reading characteristics of the scanner unit UN5 connected to the image forming apparatus.

By an instruction from the engine CPU 9 to be described later, the operations of the simple gradation processing unit 2c and the color-correction processing unit 2d of the scanner image processing unit 2 can be set enable or disable.

The controller image processing unit 3 is composed of application specific integrated circuits (ASIC). In the present embodiment, the controller image processing unit 3 is removably attached to the additional I/F unit ZZ. When the controller image processing unit 3 is attached to the additional I/F unit ZZ, the simple gradation processing unit 2c and the color-correction processing unit 2d of the scanner image processing unit 2 are set disable by an instruction from the controller CPU 5.

When the controller image processing unit 3 is not attached to the additional I/F unit ZZ, the color-correction processing unit 2d performs a simple color correction process with respect to the image data after being corrected by the scanner-characteristic correcting unit 2a. Whether the color correction process is executed or not is set by the controller CPU 5.

Depending on whether the connected plotter unit UN6 includes only the black-and-white print function, the controller CPU 5 switches an operation mode of the color-correction processing unit 2d between a black-and-white image data generation mode and a color image data generation mode. In accordance with the operation mode, the color-correction processing unit 2d performs a color correction process, and generates either multivalue black-and-white image data (hereinafter, also referred to as "grayscale image data") or color image data.

For example, when the plotter unit UN6 includes only the black-and-white print function, and the controller image processing unit 3 is not attached to the additional I/F unit ZZ, the black-and-white image data generation mode is set, and the color-correction processing unit 2d generates multivalue black-and-white image data.

Incidentally, when the black-and-white image data generation mode is set, the color-correction processing unit 2d generates multivalue black-and-white image data regardless of a result of color determination by the automatic color determining unit 2b, i.e., whether the original image is a color image or a black-and-white image. Furthermore, when the black-and-white image data generation mode is set, the color-correction processing unit 2d can start generating multivalue black-and-white image data before the result of the color determination by the automatic color determining unit 2b is output. Therefore, it is possible to shorten the processing time.

When the controller image processing unit 3 is not attached to the additional I/F unit ZZ, the simple gradation processing unit 2c performs a simple gradation process with respect to the image data after being subjected to the process by the color-correction processing unit 2d. Whether the gradation process is performed or not is set by the controller CPU 5. The simple gradation process includes, for example, a conversion from multivalue black-and-white image data into binary black-and-white image data.

The controller image processing unit 3 receives the image data output from the scanner image processing unit 2 via an input control unit 3a. When the controller image processing unit 3 is not attached to the additional I/F unit ZZ (to be described in detail later), the image data input to the controller image processing unit 3 is directly sent to an output port of the additional I/F unit ZZ. In this case, the input control unit 3a of the controller image processing unit 3 serves as a bridge.

The controller image processing unit 3 further includes a compression processing unit 3b, an expansion processing unit 3c, a color-correction processing unit 3d, a gradation processing unit 3e, and an accumulation control unit 3f. The compression processing unit 3b compresses the image data input via the input control unit 3a. The expansion processing unit 3c expands the image data. The color-correction processing unit 3d performs a color conversion of the image data depending on an output format. For example, the color-correction processing unit 3d mainly converts input RGB image data into output RGB image data or black-and-white image data. The gradation processing unit 3e performs a high-level gradation process (a well-known process). The accumulation control unit 3f accumulates data in an external storage unit 4 (such as a magnetic disk device), or reads out data from the external storage unit 4.

In addition, the controller image processing unit 3 further includes an I/F circuit (not shown) for data exchange with the controller CPU 5 that controls the entire image transfer and a DMAC 3h for data transfer to a next stage. Incidentally, in the drawing, an I/F for image data to be used by the DMAC 3h is shared with the controller CPU 5 as an I/F for the controller CPU 5. Alternatively, it is possible to provide respective I/Fs for the DMAC 3h and the controller CPU 5 separately. Moreover, the controller image processing unit 3 further includes a register 3g. The register 3g stores therein ID to be referred by the controller CPU 5 when the controller CPU 5 checks the configuration and characteristics of the controller image processing unit 3.

A read-only memory (ROM) 6 stores therein data such as a computer program to be executed by the controller CPU 5. In this example, the ROM 6 stores therein controller software 6a. When loaded by the controller CPU 5, the controller software 6a realizes a function as a control unit.

The controller CPU 5 loads the controller software 6a, and controls the operation of the controller unit UN1 or the like. For example, when the controller image processing unit 3 is attached to the additional I/F unit ZZ, the controller CPU 5 controls each of the units included in the controller image processing unit 3. More specifically, for example, when the plotter unit UN6 includes only the black-and-white print function, and the controller image processing unit 3 is attached to the additional I/F unit ZZ, the controller CPU 5 causes the input control unit 3a of the controller image processing unit 3 to receive the image data after being converted by the scanner-characteristic correcting unit 2a, and causes the accumulation control unit 3f to accumulate the received image data in the external storage unit 4, and also causes the gradation processing unit 3e to generate black-and-white image data of the image data regardless of a result of color determination by the automatic color determining unit 2b.

Subsequently, the removable additional I/F unit ZZ and an option board 30a are described below.

Figure 3:
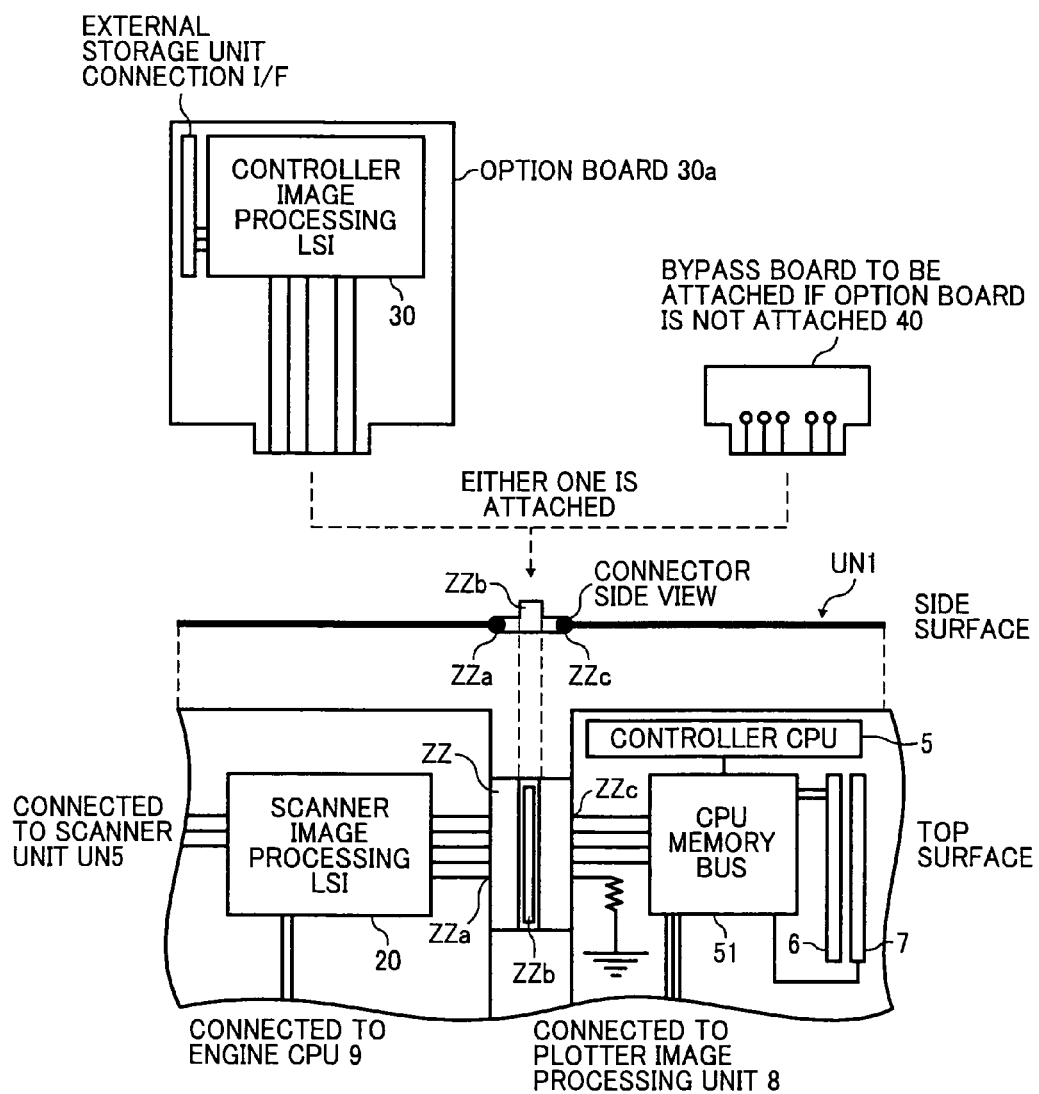
FIG. 3 is a configuration diagram of an additional interface (I/F) unit of a controller unit and an option board attached to the additional I/F unit.

FIG. 3 is a configuration diagram of the additional I/F unit ZZ of the controller unit UN1 and the option board 30a attached to the additional I/F unit ZZ. A controller image processing LSI 30 on the option board 30a is an LSI realizing the function of the controller image processing unit 3, and a scanner image processing LSI 20 is an LSI realizing the function of the scanner image processing unit 2. A CPU memory bus 51 and the additional I/F unit ZZ are provided between the controller CPU 5 and the scanner image processing LSI 20.

Figure 4:
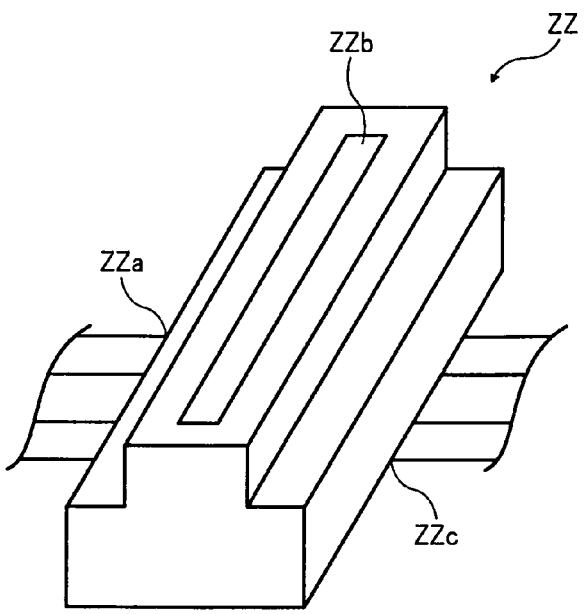
FIG. 4 is a schematic diagram illustrating a shape of the additional I/F unit.

The additional I/F unit ZZ has three connection ports ZZa, ZZb, and ZZc. The scanner image processing LSI 20 and the CPU memory bus 51 are connected to each other via the connection ports ZZa and ZZc of the additional I/F unit ZZ. In a basic configuration, a bypass board 40 is attached to the connection port ZZb of the additional I/F unit ZZ. In a configuration when the function is enhanced, the option board 30a mounting thereon the controller image processing LSI 30 is attached to the connection port ZZb. FIG. 4 is a schematic diagram illustrating a shape of the additional I/F unit ZZ. As shown in FIG. 4, the connection port ZZb is formed into an opening to which can be attached the option board 30a including the controller image processing LSI 30.

As shown in FIG. 3, of the three connection ports of the additional I/F unit ZZ, the connection ports ZZa and ZZc are provided on the left and right sides of the additional I/F unit ZZ in a horizontal direction the drawing, respectively, and the connection port ZZb is provided on the center of the two connection ports ZZa and ZZc in a vertical direction.

Figure 5:
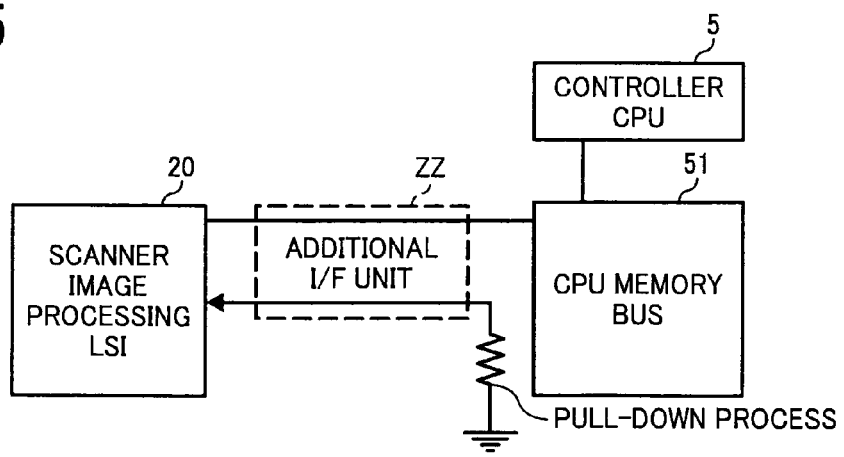
FIG. 5 is a schematic diagram illustrating a configuration of a scanner image processing large-scale integration (LSI) and a central processing unit (CPU) memory bus that are connected to each other by wiring on a bypass board via a connector.

In the basic configuration, as shown in FIG. 5, a data signal line is directly connected between the scanner image processing LSI 20 and the CPU memory bus 51 by wiring on the bypass board 40 attached to the connection port ZZb of the additional I/F unit ZZ. Therefore, the controller CPU 5 can directly set the operation mode or the like in the scanner image processing LSI 20 via the CPU memory bus 51.

Figure 6:
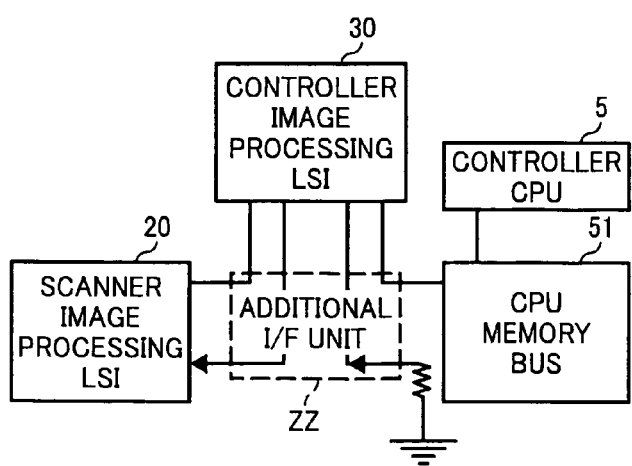
FIG. 6 is a schematic diagram illustrating a configuration of the scanner image processing LSI, a controller image processing LSI, and the CPU memory bus that are connected to one another by wiring on the option board via a connector.

When the option board 30a is attached to the connection port ZZb of the additional I/F unit ZZ, as shown in FIG. 6, the CPU memory bus 51 and the controller image processing LSI 30 are connected by wiring on the option board 30a, and also the scanner image processing LSI 20 and the controller image processing LSI 30 are connected by wiring on the option board 30a. Data transmission/reception between the CPU memory bus 51 and the controller image processing LSI 30 and data transmission/reception between the scanner image processing LSI 20 and the controller image processing LSI 30 are performed through the PCI Express.

When the controller image processing unit 3 is not mounted on the controller unit UN1, the controller CPU 5 can directly communicate with the scanner image processing unit 2. On the other hand, when the controller image processing unit 3 is mounted on the controller unit UN1, the controller CPU 5 can directly communicate with the controller image processing unit 3 instead of the scanner image processing unit 2, and the scanner image processing unit 2 can directly communicate with the controller image processing unit 3.

When the option board 30a is first attached to the connection port ZZb of the additional I/F unit ZZ, the computer program stored in the ROM 6 is updated, and an option control program for controlling the controller image processing LSI 30 is added to the ROM 6.

As shown in FIG. 3, each of the option board 30a and the bypass board 40 is formed into a flat plate, and a connect portion at a lower end of which in the drawing is inserted into the additional I/F unit ZZ. Alternatively, the option board 30a can be formed so that the connect portion is perpendicular to a mounting portion of the controller image processing LSI 30, i.e., the option board 30a can be formed into a hook. In this case, an upper space of the additional I/F unit ZZ in the drawing can be used effectively.

To return to the explanation of FIG. 2, a random access memory (RAM) 7 serves as a working area of the controller CPU 5, and also serves as a buffer in which various data is temporarily accumulated.

A plotter image processing unit 8 includes an output control unit 8a and a communication control unit 8b. The output control unit 8a transmits image data with respect to each of C, M, Y, and K color components to an image writing unit 10 of the plotter unit UN6 at different timings. The communication control unit 8b controls the communication between the controller CPU 5 and the engine CPU 9. The output control unit 8a contains a DMAC 8d.

In addition, the plotter image processing unit 8 further includes an I/F for the controller CPU 5 that controls the entire image transfer, is provided in. In FIG. 2, the I/F for image data is shared with the controller CPU 5 as the I/F for the controller CPU 5. Alternatively, it is possible to provide respective I/Fs for image data and the controller CPU 5 separately. Moreover, the plotter image processing unit 8 further includes a register 8c. The register 8c stores therein ID to be referred by the controller CPU 5 when the controller CPU 5 checks the configuration and characteristics of the plotter image processing unit 8.

The engine CPU 9 sets the operation mode of the scanner image processing unit 2 in accordance with an instruction from the controller CPU 5, and controls the operations of a plotter engine unit 11 of the plotter unit UN6 and a scanner mechanism unit 12 of the scanner unit UN5.

A Difference between the simple gradation process performed by the simple gradation processing unit 2c and the gradation process performed by the gradation processing unit 3e (hereinafter, "the high-level gradation process") is, for example, as follows. First, data subjected to the simple gradation process is 2-bit data of 4 gradation levels, while data subjected to the high-level gradation process is 4-bit data of 16 gradation levels. In other words, it can be said that the simple gradation process is lower in complexity than the high-level gradation process. Therefore, the high-level gradation process can achieve image data with a wider range of gradation and a better reproducibility than the simple gradation process can.

Figure 7:
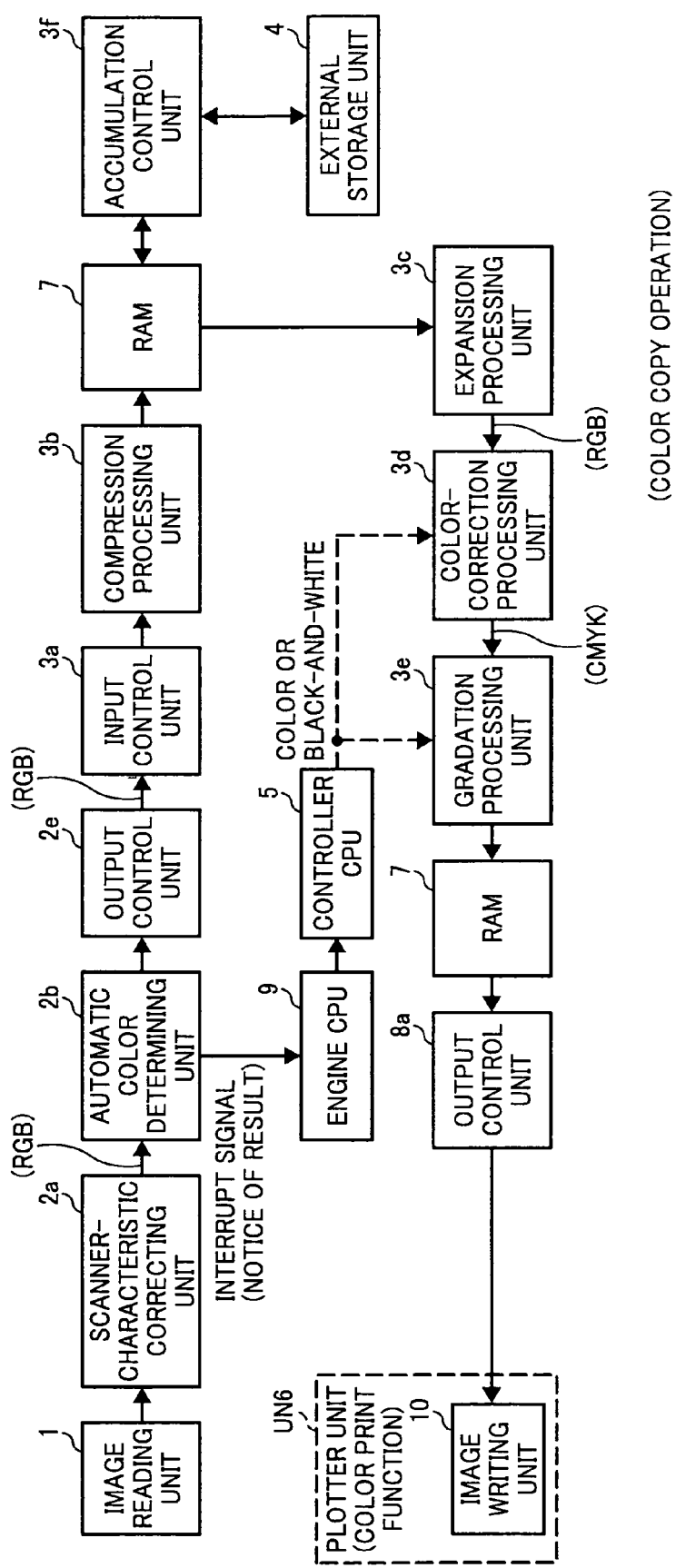
FIG. 7 is a block diagram illustrating data processing in a color copy operation when the configuration of the image forming apparatus is the maximum configuration.

FIG. 7 illustrates an example of image data processing in a color copy operation when the configuration of the image forming apparatus is the maximum configuration shown in FIG. 2, and a scanner unit including a color scanner function as the scanner unit UN5 and a plotter unit including a color print function as the plotter unit UN6 are connected to the image forming apparatus.

In this case, the controller CPU 5 can access to the controller image processing unit 3 and the plotter image processing unit 8. First, the controller CPU 5 accesses to the register 3g of the controller image processing unit 3 and the register 8c of the plotter image processing unit 8, and reads IDs stored in the registers 3g and 8c.

Then, the controller CPU 5 checks the ID read out from the register 3g of the controller image processing unit 3. In this case, a value of the ID matches a value indicating the controller image processing unit 3, and the controller CPU 5 recognizes that the apparatus configuration is the maximum configuration.

Thus, the controller CPU 5 instructs the engine CPU 9 to set the operation mode of the scanner image processing unit 2 so as to disable the operations of the simple gradation processing unit 2c and the color-correction processing unit 2d, and further instructs the engine CPU 9 to receive an interrupt signal output from the automatic color determining unit 2b and inform the controller CPU 5 of content of the received interrupt signal.

In accordance with the instructions from the controller CPU 5, the engine CPU 9 sets a control register 2h, which sets the operation mode of the scanner image processing unit 2, to set the operations of the simple gradation processing unit 2c and the color-correction processing unit 2d disable, and further sets a value causing the engine CPU 9 to receive the interrupt signal output from the automatic color determining unit 2b. The interrupt signal indicates a result of color determination by the automatic color determining unit 2b.

After such an operation mode is set, the operation as shown in FIG. 7 is performed. Namely, the image reading unit 1 reads image data, and outputs the read image data to the scanner-characteristic correcting unit 2a. The scanner-characteristic correcting unit 2a performs a shading correction, a gamma transformation, a filtering process, and a color conversion with respect to the image data. The image data output from the scanner-characteristic correcting unit 2a is input to the automatic color determining unit 2b, and also output to the input control unit 3a of the controller image processing unit 3 by the output control unit 2e. At this time, the output control unit 2e outputs the image data with the image data packed in an RGB line sequential data set.

The input control unit 3a transfers the received image data to the compression processing unit 3b and the gradation processing unit 3e. The compression processing unit 3b compresses the image data by the application of a predetermined compression process, and temporarily stores the compressed image data in the RAM 7. The compressed image data is arbitrarily accumulated in the external storage unit 4 by the accumulation control unit 3f.

Until the compressed image data of an amount corresponding to one page is accumulated in the RAM 7, the automatic color determining unit 2b determines whether an original image of the received compressed image data corresponding to one page is a color image or a black-and-white image, and outputs an interrupt signal indicating a result of the color determination to the engine CPU 9. The engine CPU 9 receives the interrupt signal. Once the automatic color determining unit 2b detects a color image in the compressed image data, the automatic color determining unit 2b can determine that the image data is a color image. On the other hand, in a case of a black-and-white image, the automatic color determining unit 2b cannot determine whether the image data is a black-and-white image until the automatic color determining unit 2b reads the whole image data corresponding to one page. The engine CPU 9 informs the controller CPU 5 of content of the received interrupt signal.

When informed of the content of the interrupt signal, the controller CPU 5 informs the color-correction processing unit 3d and the gradation processing unit 3e of the result of the color determination, i.e., whether the read image data is a color image or a black-and-white image.

Then, the compressed image data stored in the RAM 7 is transferred to the expansion processing unit 3c. The expansion processing unit 3c converts the received compressed image data into original image data (an expansion process), and transfers the image data to the color-correction processing unit 3d.

When the controller CPU 5 informs, as the result of the color determination, that the image data is a color image, the color-correction processing unit 3d converts the received image data into RGB data (color image data) in a predetermined output format, and outputs the color image data to the gradation processing unit 3e. In this case, the gradation processing unit 3e does not apply a gradation process to the color image data received from the color-correction processing unit 3d, and directly accumulates the color image data in the RAM 7.

On the other hand, when the controller CPU 5 informs, as the result of the color determination, that the image data is a black-and-white image, the color-correction processing unit 3d converts the received image data into black-and-white image data, and outputs the black-and-white image data to the gradation processing unit 3e. In this case, the gradation processing unit 3e applies a gradation process to the black-and-white image data received from the color-correction processing unit 3d, and generates, for example, black-and-white image data of 2 gradation levels (binary image data), and then accumulates the binary image data in the RAM 7.

The color or black-and-white image data stored in the RAM 7 is transferred to the output control unit 8a of the plotter image processing unit 8 by the controller CPU 5.

The output control unit 8a transfers the received CMYK print data to the image writing unit 10 in synchronization with a print timing of the image writing unit 10. The image writing unit 10 records an image of the print data on a sheet, and discharges the sheet.

Figure 8:
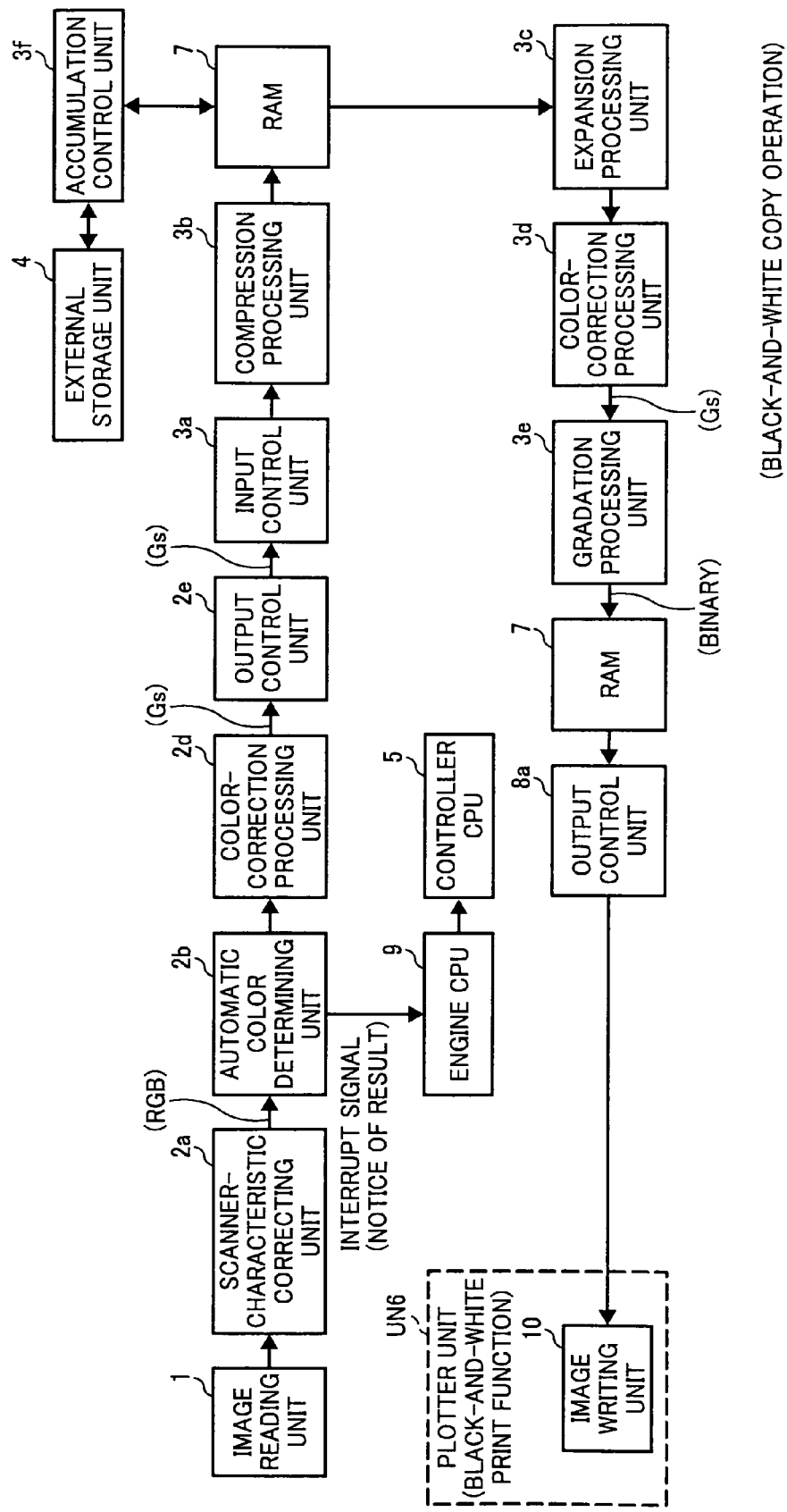
FIG. 8 is a block diagram illustrating data processing in a black-and-white copy operation when the configuration of the image forming apparatus is the maximum configuration.

FIG. 8 illustrates an example of image data processing in a black-and-white copy operation when the configuration of the image forming apparatus is the maximum configuration shown in FIG. 2, and the scanner unit including the color scanner function as the scanner unit UN5 and a plotter unit including a black-and-white print function as the plotter unit UN6 are connected to the image forming apparatus. As an example of a type of the image forming apparatus having such a configuration, there is a high-speed black-and-white MFP. In recent years, when a black-and-white MFP is used as a scanner, the black-and-white MFP can read a color image even though it is not a color MFP. Thus, such a configuration is sometimes employed in a black-and-white MFP.

In this case also, first, the controller CPU 5 accesses to the register 3g of the controller image processing unit 3 and the register 8c of the plotter image processing unit 8, and reads IDs stored in the registers 3g and 8c. Then, the controller CPU 5 checks the ID read out from the register 3g of the controller image processing unit 3. In this case, a value of the ID matches a value indicating the controller image processing unit 3, and the controller CPU 5 recognizes that the apparatus configuration is the maximum configuration.

In this case, the plotter unit UN6 includes only the black-and-white print function. Thus, read image data to be output from the scanner image processing unit 2 can be binary black-and-white image data, in this case, it is possible to reduce a volume of image data.

However, the controller image processing unit 3 is designed to process high-level image data, so that the input control unit 3a of the controller image processing unit 3 is configured to receive multivalue color image data. Namely, the input control unit 3a cannot directly receive binary black-and-white image data. In other words, the input control unit 3a receives multivalue image data only.

Furthermore, the print speed of the high-speed black-and-white MFP is mostly set at high speed. Thus, if the scanner unit UN5 including the color scanner function sends color image data in the same manner as in a color MFP, a bandwidth shortage may occur between the scanner image processing unit 2 and the controller image processing unit 3.

Therefore, in this case, the color-correction processing unit 2d converts the RGB color image data output from the scanner-characteristic correcting unit 2a into grayscale image data (Gs), and outputs the grayscale image data as multivalue black-and-white image data to the input control unit 3a of the controller image processing unit 3. Therefore, the input control unit 3a can receive the grayscale image data properly because the grayscale image data is not binary image data. Furthermore, an amount of information of the grayscale image data is reduced as compared with color image data, so that it is possible to prevent the bandwidth shortage from occurring.

Consequently, in this case, the controller CPU 5 sets the operation of the simple gradation processing unit 2c disable in the same manner as in the color copy operation. In addition, the controller CPU 5 needs to set the operation mode of the color-correction processing unit 2d to a black-and-white image data generation mode. However, the controller CPU 5 is not directly connected to the scanner image processing unit 2. Thus, the controller CPU 5 instructs the engine CPU 9 via the communication control unit 8b of the plotter image processing unit 8 to set, as the operation mode of the scanner image processing unit 2, the operation mode of the color-correction processing unit 2d to the black-and-white image data generation mode and not to use the simple gradation processing unit 2c, and further instructs the engine CPU 9 to receive the interrupt signal output from the automatic color determining unit 2b and inform the controller CPU 5 of content of the received interrupt signal.

In accordance with the instructions from the controller CPU 5, the engine CPU 9 sets the control register 2h, which sets the operation mode of the scanner image processing unit 2, to disable the operation of the simple gradation processing unit 2c of the scanner image processing unit 2, and sets the operation mode of the color-correction processing unit 2d to the black-and-white image data generation mode, and further sets a value causing the engine CPU 9 to receive the interrupt signal, indicating a result of color determination, output from the automatic color determining unit 2b. However, actually, only a black-and-white image is processed, so that there is no chance the interrupt signal from the automatic color determining unit 2b is used (details will be described later).

After such an operation mode is set, the operation as shown in FIG. 8 is performed. Namely, the image reading unit 1 reads image data, and outputs the read image data to the scanner-characteristic correcting unit 2a. The scanner-characteristic correcting unit 2a performs a shading correction, a gamma transformation, a filtering process, and a color conversion with respect to the image data. The image data output from the scanner-characteristic correcting unit 2a is input to the automatic color determining unit 2b and the color-correction processing unit 2d.

The color-correction processing unit 2d converts the received color image data into corresponding grayscale image data (Gs). The grayscale image data is output to the input control unit 3a of the controller image processing unit 3 by the output control unit 2e.

The input control unit 3a transfers the received grayscale image data to the compression processing unit 3b. The compression processing unit 3b compresses the image data by the application of a predetermined compression process, and temporarily stores the compressed image data in the RAM 7. The compressed image data is arbitrarily accumulated in the external storage unit 4 by the accumulation control unit 3f.

Until the compressed image data of an amount corresponding to one page is accumulated in the RAM 7, the automatic color determining unit 2b determines whether an original image of the received compressed image data corresponding to one page is a color image or a black-and-white image, and outputs an interrupt signal indicating a result of the color determination to the engine CPU 9. The engine CPU 9 receives the interrupt signal, and informs the controller CPU 5 of content of the received interrupt signal.

In this case, image data is already converted into black-and-white image data in the scanner image processing unit 2, and thus every image data transferred to the plotter unit UN6 is black-and-white image data. Therefore, in this case, the controller CPU 5 ignores the result of the color determination informed from the engine CPU 9. In this manner, the controller CPU 5 determines whether to inform the result of the color determination based on the configuration of the plotter unit UN6 (specifically, whether the plotter unit UN6 includes only the black-and-white print function or not). Consequently, the scanner image processing unit 2 can process image data without considering whether it is a scanner operation requiring automatic color determination of the image data or a black-and-white copy operation not requiring the automatic color determination.

The compressed grayscale image data stored in the RAM 7 is transferred to the expansion processing unit 3c. The expansion processing unit 3c converts the received compressed grayscale image data into original grayscale image data (an expansion process), and transfers the grayscale image data to the color-correction processing unit 3d.

In this case, the color-correction processing unit 3d converts the received grayscale image data into grayscale image data in accordance with output characteristics, and outputs the grayscale image data to the gradation processing unit 3e.

The gradation processing unit 3e applies a gradation process to the grayscale image data received from the color-correction processing unit 3d. The gradation process is performed in accordance with the control of the controller CPU 5. For example, when the plotter unit UN6 includes only the black-and-white print function, the gradation processing unit 3e generates black-and-white image data of 2 gradation levels (binary image data) in accordance with an instruction for generating binary image data from the controller CPU 5, and accumulates the generated black-and-white image data in the RAM 7.

The black-and-white image data (black-and-white print data) stored in the RAM 7 is transferred to the output control unit 8a of the plotter image processing unit 8 by the controller CPU 5.

The output control unit 8a transfers the received black-and-white print data to the image writing unit 10 in synchronization with a print timing of the image writing unit 10. The image writing unit 10 records an image of the print data on a sheet, and discharges the sheet.

The controller image processing unit 3 and the scanner image processing unit 2 include the DMACs 3h and 2g, respectively. Each of the DMACs 3h and 2g transfers data while creating an address of the memory thereby storing the data in the RAM 7 connected to the controller CPU 5, or accesses data stored in the RAM 7. The DMAC (2g, 3h) employs a descriptor method for storing a series of data in the memory with the data split or accessing such split data stored in the memory by automatically chaining the data, so that it is possible to achieve memory management or image management with OS (operating software, an operating system) of the controller software 6a (the controller CPU 5). A value determined by the OS of the controller software is set, so that address setting on the DMAC is made by the controller software. Incidentally, which path to be used for data transfer by the DMAC (2g, 3h) can be arbitrarily set, and the concrete description is omitted.

Figure 9:
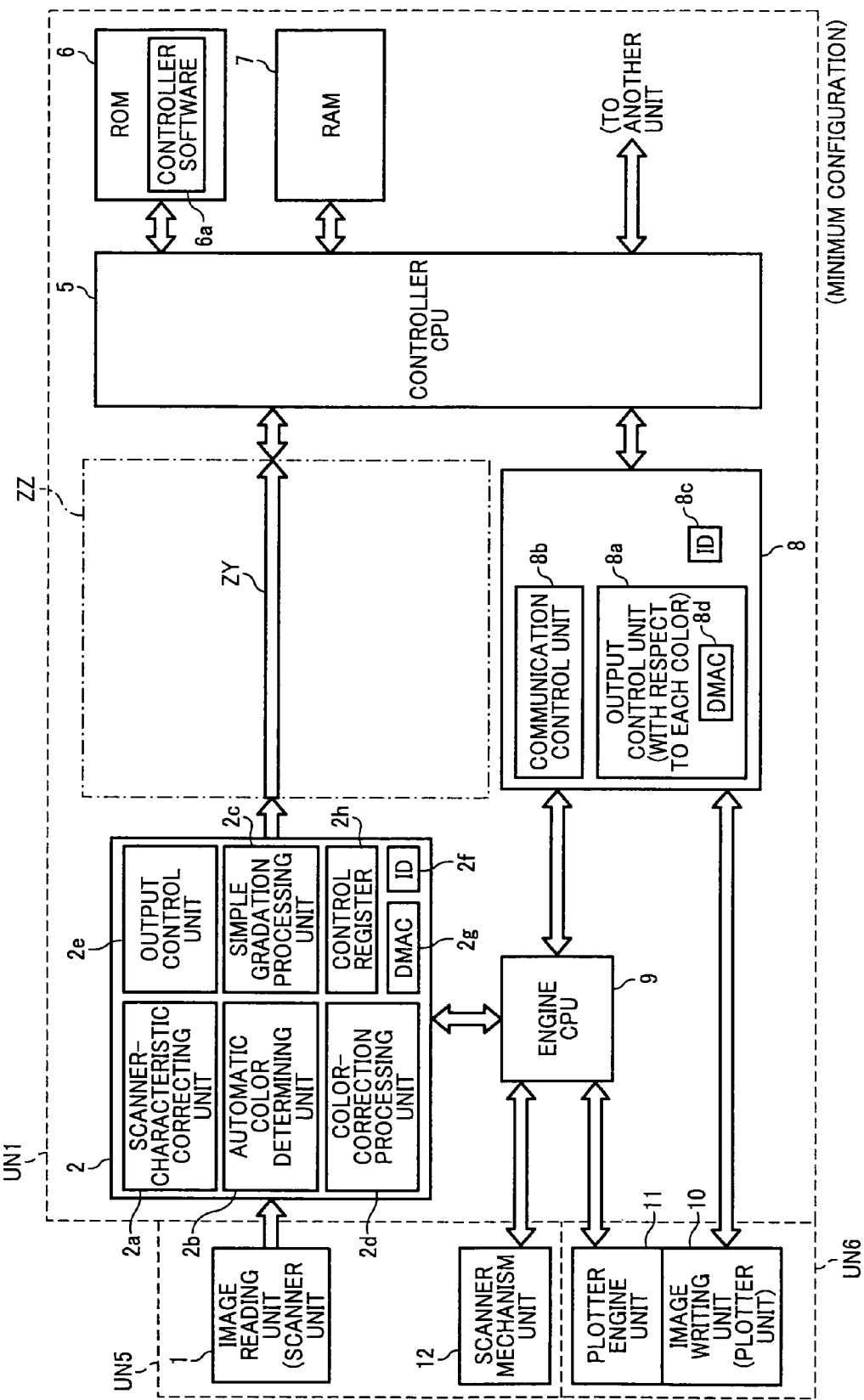
FIG. 9 is a block diagram illustrating an example of a minimum configuration of the image forming apparatus.

FIG. 9 illustrates another schematic configuration of the controller unit UN1 of the image forming apparatus to which the scanner unit UN5 and the plotter unit UN6 are both connected, particularly another configuration example of a portion of the controller unit UN1 that performs image processing. Hereinafter, such a configuration is referred to as "a minimum configuration". Incidentally, the portions identical to those in FIG. 2 are denoted with the same reference numerals, and the description of those portions is omitted. As an example of a type of the image forming apparatus having such a configuration, there is an inexpensive black-and-white MFP.

In this example, the controller image processing unit 3 is not attached to the additional I/F unit ZZ. An input port of the additional I/F unit ZZ, i.e., an output port of the scanner image processing unit 2 is connected to an output port of the additional I/F unit ZZ, i.e., the I/F of the controller CPU 5 by a signal line ZY. Thus, in this case, the controller CPU 5 can access to the scanner image processing unit 2.

Figure 10:
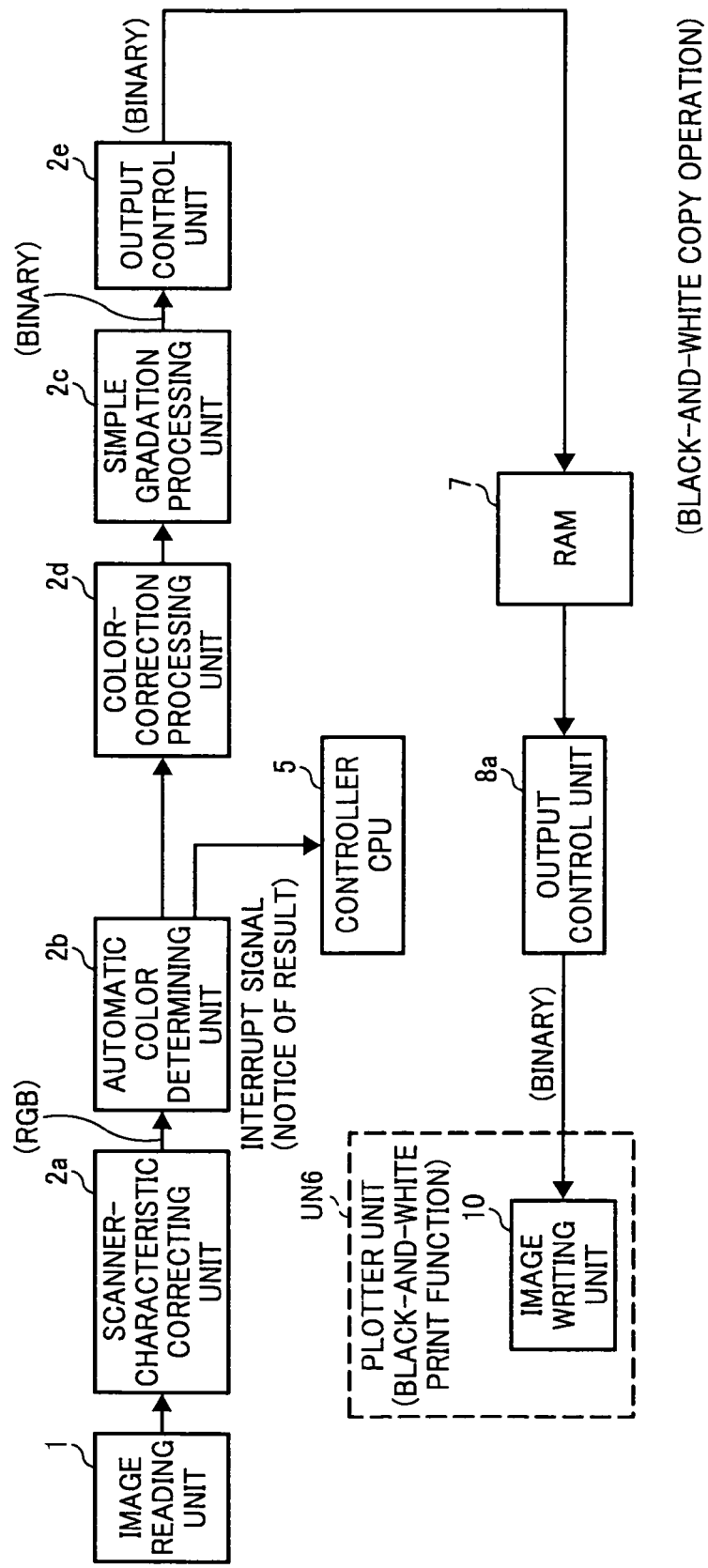
FIG. 10 is a block diagram illustrating data processing in a black-and-white copy operation when the configuration of the image forming apparatus is the minimum configuration.

FIG. 10 illustrates an example of image data processing in a black-and-white copy operation when the configuration of the image forming apparatus is the minimum configuration shown in FIG. 9, and a scanner unit including the color scanner function as the scanner unit UN5 and a plotter unit including the black-and-white print function as the plotter unit UN6 are connected to the image forming apparatus.

In this case, the controller CPU 5 can access to the scanner image processing unit 2. Thus, first, the controller CPU 5 accesses to the register 2f of the scanner image processing unit 2, and reads ID stored in the register 2f.

Then, the controller CPU 5 checks the ID read out from the register 2f of the scanner image processing unit 2. In this case, a value of the ID matches a value indicating the scanner image processing unit 2, and the controller CPU 5 recognizes that the apparatus configuration is the minimum configuration.

Thus, the controller CPU 5 sets the operations of the simple gradation processing unit 2c of the scanner image processing unit 2 enable, and sets the operation of the color-correction processing unit 2d to the black-and-white image data generation mode, and further sets so that the controller CPU 5 receives an interrupt signal, indicating a result of color determination, output from the automatic color determining unit 2b.

Specifically, the controller CPU 5 instructs the engine CPU 9 to set the operation mode of the scanner image processing unit 2 so as to enable the operation of the simple gradation processing unit 2c, and instructs the engine CPU 9 to set the operation of the color-correction processing unit 2d to the black-and-white image data generation mode, and further instructs the engine CPU 9 to transmit an interrupt signal output from the automatic color determining unit 2b to the controller CPU 5. However, the controller image processing unit 3 is not mounted on the controller unit UN1, so that image data cannot be accumulated in the external storage unit 4. Thus, even when the controller CPU 5 receives an interrupt signal from the automatic color determining unit 2b, it is not possible to convert the image data (details will be described later).

In accordance with the instructions from the controller CPU 5, the engine CPU 9 sets the control register 2h, which sets the operation mode of the scanner image processing unit 2, to set the operation of the simple gradation processing unit 2c enable and to set the operation of the color-correction processing unit 2d to the black-and-white image data generation mode, and further sets a value for setting the operation mode so as to output an interrupt signal from the automatic color determining unit 2b to the controller CPU 5.

After such an operation mode is set, the operation as shown in FIG. 10 is performed. Namely, the image reading unit 1 reads image data, and outputs the read image data to the scanner-characteristic correcting unit 2a. The scanner-characteristic correcting unit 2a performs a shading correction, a gamma transformation, a filtering process, and a color conversion with respect to the image data. The image data output from the scanner-characteristic correcting unit 2a is input to the automatic color determining unit 2b and the color-correction processing unit 2d.

The color-correction processing unit 2d starts converting the received image data into black-and-white image data before a result of color determination by the automatic color determining unit 2b is out. Then, the color-correction processing unit 2d outputs the converted black-and-white image data to the simple gradation processing unit 2c. The simple gradation processing unit 2c converts the received black-and-white image data into 1-bpp (bits per pixel) binary image data by the application of a gradation process, and outputs the binary image data to the output control unit 2e. Incidentally, the gradation process by the simple gradation processing unit 2c is performed before the result of the color determination by the automatic color determining unit 2b is, out.

This is because in the inexpensive type of the image forming apparatus, a bandwidth of a bus to be used is set narrow (for example, when the PCI Express is used as a bus system in the apparatus, the number of lanes is reduced). At this time, if a common bandwidth is used for data transmission between the scanner image processing unit 2 and the controller CPU 5 and data transmission between the controller CPU 5 and the plotter image processing unit 8, a bandwidth shortage may occur. Furthermore, in this case, the controller image processing unit 3 is not mounted on the image forming apparatus, so that the image data cannot be accumulated in the external storage unit 4. Thus, even when the controller CPU 5 receives an interrupt signal from the automatic color determining unit 2b, it is not possible to convert the image data. Therefore, at the time of reading an image, image data needs to be converted into processable data by the plotter unit UN6.

The output control unit 2e transfers the black-and-white image data from the simple gradation processing unit 2c to the RAM 7 to store the black-and-white image data in the RAM 7.

In this manner, until the black-and-white image data of an amount corresponding to one page is stored in the RAM 7, the automatic color determining unit 2b outputs an interrupt signal, indicating a result of color determination of the received image data corresponding to one page, to the controller CPU 5.

In this case also, in the same manner as described above, the controller CPU 5 ignores the result of the color determination informed from the automatic color determining unit 2b.

Then, the controller CPU 5 transfers the black-and-white image data (the binary image data) stored in the RAM 7 to the output control unit 8a of the plotter image processing unit 8.

The output control unit 8a transfers the received black-and-white print data to the image writing unit 10 in synchronization with a print timing of the image writing unit 10. The image writing unit 10 records an image of the print data on a sheet, and discharges the sheet.

Figure 11:
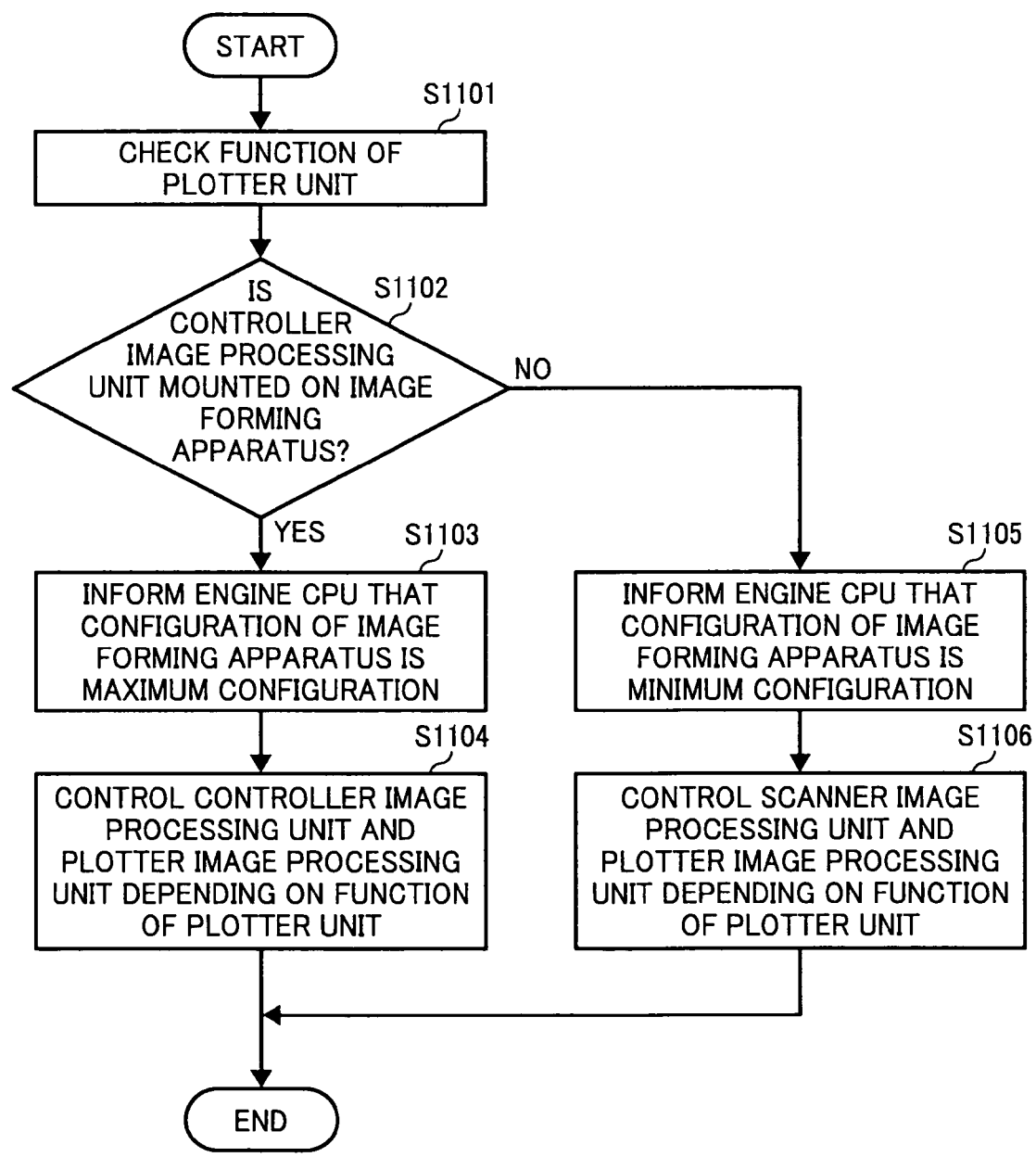
FIG. 11 is a flowchart of a schematic example of a process performed by the controller unit when determining the apparatus configuration.

FIG. 11 is a flowchart of a schematic example of a process performed by the controller unit UN1 when determining the apparatus configuration.

When powered on, the controller CPU 5 loading the controller software 6a checks a connection status of each of the units (Step S1101). At this time, the controller CPU 5 checks whether the connected plotter unit UN6 includes only the black-and-white print function or both the black-and-white print function and the color print function.

The controller CPU 5 checks ID of a device mounted on a portion where the controller image processing unit 3 is supposed to be mounted, and thereby determining whether the controller image processing unit 3 is mounted on the image forming apparatus (Step S1102).

When determining that the ID matches that of the controller image processing unit 3, the controller CPU 5 determines that the configuration of the image forming apparatus is the maximum configuration (YES at Step S1102), and informs the engine CPU 9 that the configuration of the image forming apparatus is the maximum configuration (Step S1103). Then, the controller CPU 5 controls the controller image processing unit 3 and the plotter image processing unit 8 depending on whether the plotter unit UN6 includes only the black-and-white print function or not (Step S1104). Specifically, if the plotter unit UN6 includes the color print function, the controller CPU 5 controls so as to perform the process by the processing procedure shown in FIG. 7. On the other hand, if the plotter unit UN6 includes only the black-and-white print function, the controller CPU 5 controls so as to perform the process by the processing procedure shown in FIG. 8.

On the other hand, when the ID matches that of the scanner image processing unit 2, the controller CPU 5 determines that the configuration of the image forming apparatus is the minimum configuration (NO at Step S1102), and informs the engine CPU 9 that the configuration of the image forming apparatus is the minimum configuration (Step S1105). Then, the controller CPU 5 controls the scanner image processing unit 2 and the plotter image processing unit 8 depending on whether the plotter unit UN6 includes only the black-and-white print function or not (Step S1106). Specifically, if the plotter unit UN6 includes only the black-and-white print function, the controller CPU 5 controls so as to perform the process by the processing procedure shown in FIG. 10. Incidentally, the process to be performed when the plotter unit UN6 includes the color print function is made in the same manner as in the conventional technology, and the description of the process is omitted.

In the above embodiment, before image data is accumulated in the external storage unit 4, the image data is compressed by a predetermined compression process. For example, an encryption process can be further applied to the compressed image data. By the application of the encryption process, in case the external storage unit 4 is carried off, it is possible to avoid such a situation that image data accumulated in the external storage unit 4 is used by someone with malicious intent. Furthermore, in the above embodiment, the present invention is applied to the scanner unit. The present invention can be applied to any image processing apparatuses as long as the image processing apparatuses include an image reading function. As for the MFP described above, similarly, the present invention can be applied to any MFPs as long as the MFPs include an image reading function.

Figure 12:
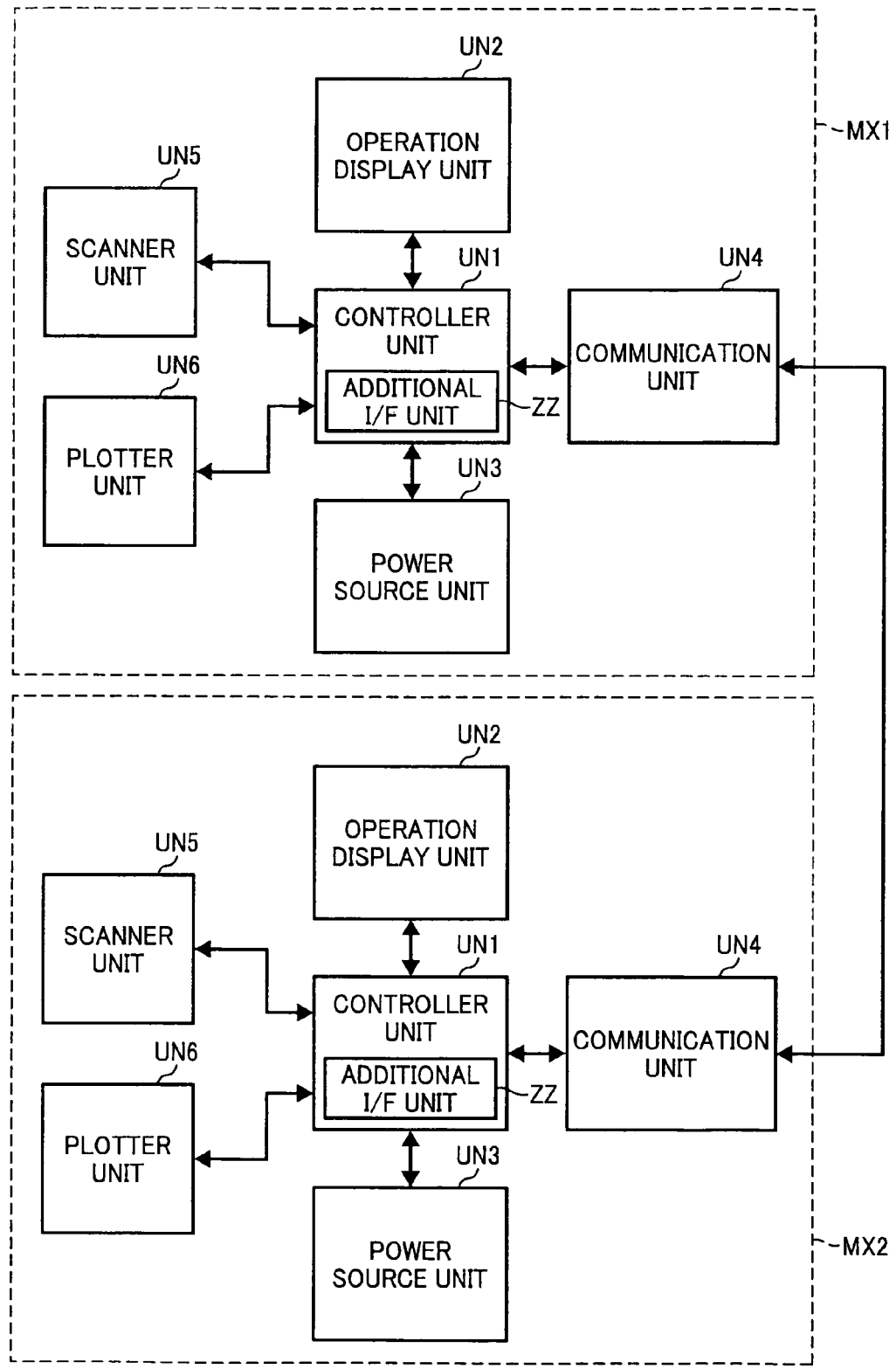
FIG. 12 is a block diagram illustrating an example of image forming apparatuses realizing a link print mode.

FIG. 12 illustrates an example of image processing apparatuses realizing a link print mode. In this example, two image processing apparatuses MX1 and MX2 having the same configuration as shown in FIG. 1 are interconnected via the communication units UN4 thereof. The basic configuration of the image processing apparatuses MX1 and MX2 is identical to that of the image processing apparatus described in the above embodiment, and the detailed description of the configuration of the image processing apparatuses MX1 and MX2 is omitted.

In this case, a copy image of an image read by the scanner unit UN5 of the image processing apparatus MX1 shall be formed by the plotter units UN6 of the image processing apparatus MX1 and the image processing apparatus MX2. To distinguish between the image processing apparatuses MX1 and MX2, hereinafter, the image processing apparatus MX1 shall be referred to as "the parent apparatus MX1", and the image processing apparatus MX2 shall be referred to as "the child apparatus MX2".

Incidentally, as for a case where the configurations of the parent apparatus MX1 and the child apparatus MX2 are both the maximum configuration (see FIG. 2), or the configuration of the parent apparatus MX1 is the maximum configuration and the configuration of the child apparatus MX2 is the minimum configuration (see FIG. 9), and a scanner unit including a color scanner function as the scanner unit UN5 and a color plotter unit including a color print function as the plotter unit UN6 are connected to each of the parent apparatus MX1 and the child apparatus MX2, although it is possible to realize the case by a combination of the configurations illustrated in the above embodiment, the description is omitted.

Figure 13:
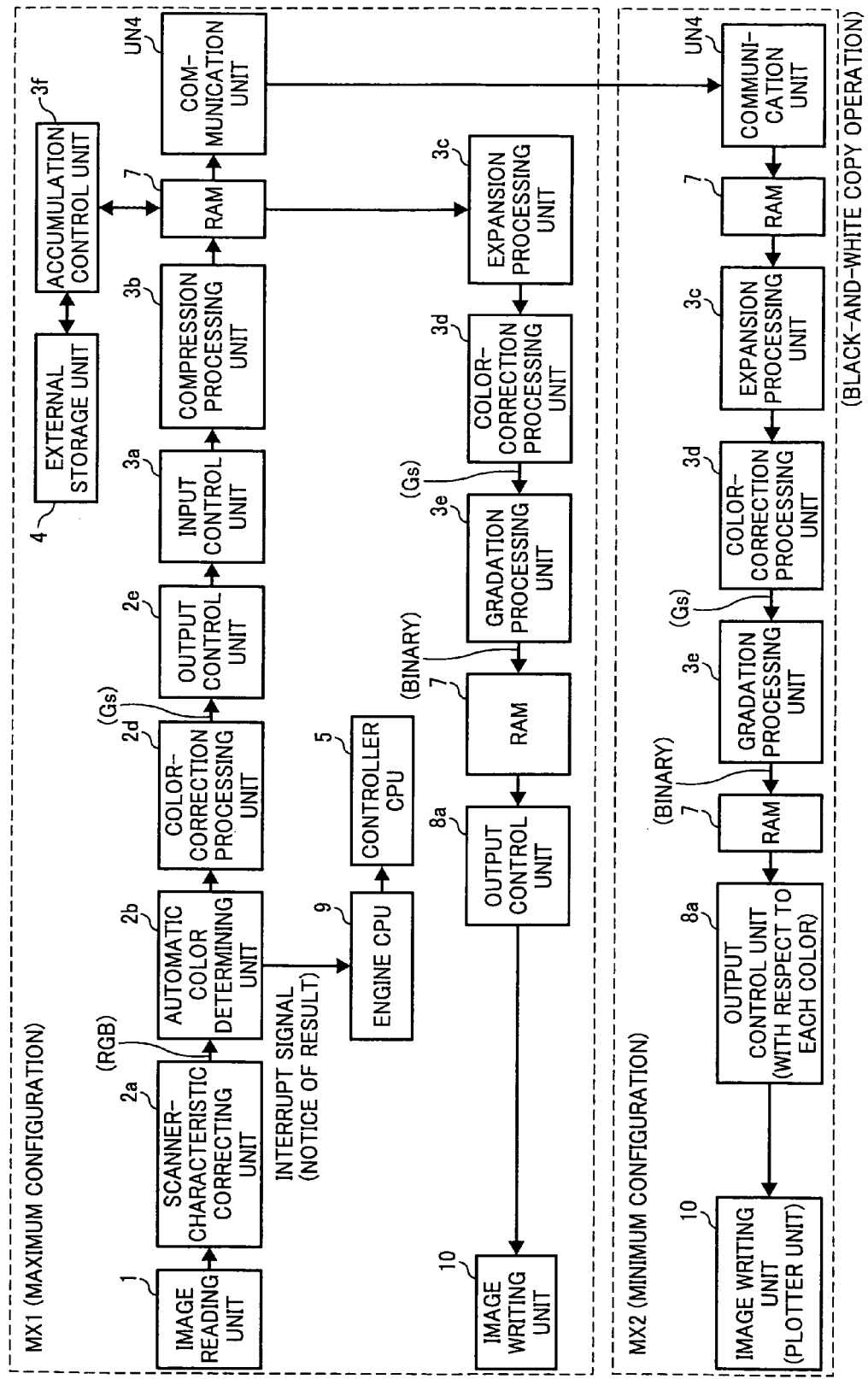
FIG. 13 is a block diagram illustrating data processing in a black-and-white copy operation when the configurations of both a parent apparatus and a child apparatus are the maximum configuration, and a black-and-white plotter unit including a black-and-white print function is connected as a plotter unit to each of the parent apparatus and the child apparatus.

FIG. 13 illustrates an example of data processing in a black-and-white copy operation when the configurations of the parent apparatus MX1 and the child apparatus MX2 are both the maximum configuration (see FIG. 2), and the black-and-white plotter unit including the black-and-white print function is connected as the plotter unit UN6 to each of the parent apparatus MX1 and the child apparatus MX2. Incidentally, the initial setting operation of each of the parent apparatus MX1 and the child apparatus MX2 is identical to that is described in the above embodiment, and the description is omitted.

First, the operation of the parent apparatus MX1 is explained below. In this example, processes from when the image reading unit 1 reads image data till when grayscale image data into which the image data is converted is arbitrarily accumulated in the external storage unit 4 are identical to those described above, and the description of the processes is omitted.

The color-correction processing unit 2d converts received color image data into corresponding grayscale image data (Gs). The grayscale image data is output to the input control unit 3a of the controller image processing unit 3 by the output control unit 2e.

The input control unit 3a transfers the received grayscale image data to the compression processing unit 3b. The compression processing unit 3b compresses the image data by the application of a predetermined compression process, and temporarily stores the compressed image data in the RAM 7. The compressed image data is arbitrarily accumulated in the external storage unit 4 by the accumulation control unit 3f.

Until the compressed image data of an amount corresponding to one page is accumulated in the RAM 7, the automatic color determining unit 2b determines whether an original image of the received compressed image data corresponding to one page is a color image or a black-and-white image, and outputs an interrupt signal indicating a result of the color determination to the engine CPU 9. The engine CPU 9 receives the interrupt signal, and informs the controller CPU 5 of content of the received interrupt signal. When informed of the content of the interrupt signal, the controller CPU 5 transmits the compressed image data accumulated in the RAM 7 to the child apparatus MX2 via the communication unit UN4.

Considering an amount of data transmitted between the communication units UN4 of the parent apparatus MX1 and the child apparatus MX2, the parent apparatus MX1 converts the image data into black-and-white image data of 2 gradation levels before transmitting the image data to the child apparatus MX2, which leads to improvement in efficiency. However, in this case, the image data is not converted in accordance with output characteristics of the child apparatus MX2, and thus an image quality of a printed image is not sufficiently high.

In this case also, in the same manner as described above, the controller CPU 5 ignores the result of the color determination informed from the engine CPU 9. Furthermore, the controller CPU 5 need not transmit the result of the color determination to the child apparatus MX2 (even if the controller CPU 5 transmits the result of the color determination to the child apparatus MX2, the child apparatus MX2 ignores the result of the color determination).

How the compressed grayscale image data stored in the RAM 7 is processed is identical to that is described above, and the description of processing procedures is omitted.

Subsequently, the operation of the child apparatus MX2 is explained below. In this case, the child apparatus MX2 receives the compressed grayscale image data corresponding to one page from the parent apparatus MX1 via the communication unit UN4, and stores the compressed grayscale image data in the RAM 7.

The compressed grayscale image data stored in the RAM 7 is transferred to the expansion processing unit 3c. The expansion processing unit 3c converts the received compressed grayscale image data into original grayscale image data (an expansion process), and transfers the converted grayscale image data to the color-correction processing unit 3d of the controller image processing unit 3.

In this case, the color-correction processing unit 3d converts the received grayscale image data in accordance with output characteristics of the black-and-white plotter unit mounted on a terminal thereof (for example, performs a gamma transformation with respect to the received grayscale image data), and outputs the grayscale image data to the gradation processing unit 3e. In this case, the gradation processing unit 3e applies a gradation process to the grayscale image data received from the color-correction processing unit 3d, and generates, for example, black-and-white image data of 2 gradation levels (binary image data), and then accumulates the black-and-white image data in the RAM 7.

The black-and-white image data (black-and-white print data) stored in the RAM 7 is transferred to the output control unit 8a of the plotter image processing unit 8 by the controller CPU 5.

The output control unit 8a transfers the received black-and-white print data to the image writing unit 10 in synchronization with a print timing of the image writing unit 10. The image writing unit 10 records an image of the print data on a sheet, and discharges the sheet.

Figure 14:
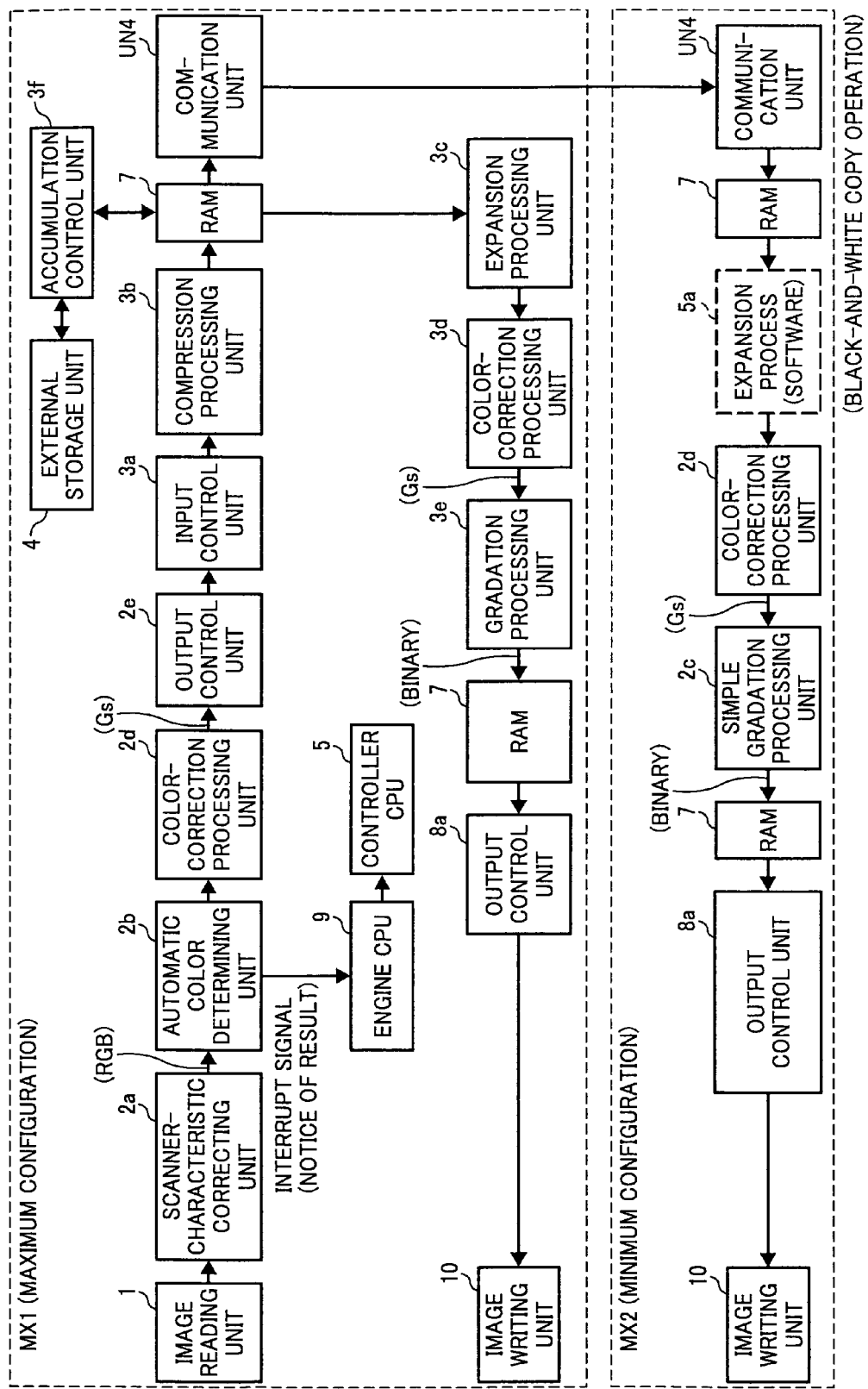
FIG. 14 is a block diagram illustrating data processing in a black-and-white copy operation when the configuration of the parent apparatus is the maximum configuration, the configuration of the child apparatus is the minimum configuration, and the black-and-white plotter unit including the black-and-white print function is connected as the plotter unit to each of the parent apparatus and the child apparatus.

FIG. 14 illustrates an example of data processing in a black-and-white copy operation when the configuration of the parent apparatus MX1 is the maximum configuration (see FIG. 2), the configuration of the child apparatus MX2 is the minimum configuration (see FIG. 9), and the scanner unit including the color scanner function as the scanner unit UN5 and the black-and-white plotter unit including the black-and-white print function as the plotter unit UN6 are connected to each of the parent apparatus MX1 and the child apparatus MX2. Incidentally, the initial setting operation of each of the parent apparatus MX1 and the child apparatus MX2 is identical to that is described above, and the description is omitted.

First, the operation of the parent apparatus MX1 is explained below. In this example, processes from when the image reading unit 1 reads image data till when grayscale image data into which the image data is converted is arbitrarily accumulated in the external storage unit 4 are identical to those described above, and the description of the processes is omitted.

Until the compressed image data of an amount corresponding to one page is accumulated in the RAM 7, the automatic color determining unit 2b determines whether an original image of the received compressed image data corresponding to one page is a color image or a black-and-white image, and outputs an interrupt signal indicating a result of the color determination to the engine CPU 9. The engine CPU 9 receives the interrupt signal, and informs the controller CPU 5 of content of the received interrupt signal. When informed of the content of the interrupt signal, the controller CPU 5 transmits the compressed image data accumulated in the RAM 7 to the child apparatus MX2 via the communication unit UN4.

Considering that the configuration of the child apparatus MX2 is the minimum configuration, unless the parent apparatus MX1 converts the image data into black-and-white image data of 2 gradation levels, the image data cannot be printed out. However, the parent apparatus MX1 cannot obtain output characteristics of the child apparatus MX2 and the like, and thus the parent apparatus MX1 cannot perform a conversion process in accordance with the output characteristics of the child apparatus MX2 (the result of the color determination informed from the engine CPU 9 is identical to that is described above).

How the compressed grayscale image data stored in the RAM 7 is processed is identical to that is described above, and the description of processing procedures is omitted.

In this case, the color-correction processing unit 3*d* converts the received grayscale image data into grayscale image data in a predetermined output format, and outputs the converted grayscale image data to the gradation processing unit 3*e*. In this case, the gradation processing unit 3*e* applies a gradation process to the grayscale image data received from the color-correction processing unit 3*d*, and generates, for example, black-and-white image data of 2 gradation levels (binary image data), and then accumulates the black-and-white image data in the RAM 7.

The black-and-white image data (black-and-white print data) stored in the RAM 7 is transferred to the output control unit 8*a* of the plotter image processing unit 8 by the controller CPU 5.

The output control unit 8*a* transfers the received black-and-white print data to the image writing unit 10 in synchronization with a print timing of the image writing unit 10. The image writing unit 10 records an image of the print data on a sheet, and discharges the sheet.

Subsequently, the operation of the child apparatus MX2 is explained below. In this case, the child apparatus MX2 receives the compressed grayscale image data corresponding to one page from the parent apparatus MX1 via the communication unit UN4, and stores the compressed grayscale image data in the RAM 7.

In this case, the configuration of the child apparatus MX2 is the minimum configuration, and the controller image processing unit 3 is not mounted thereon, i.e., the child apparatus MX2 includes no hardware for expanding the compressed grayscale image data. Thus, the compressed grayscale image data stored in the RAM 7 is converted into original image data by an expansion processing unit 5*a*. The expansion processing unit 5*a* is realized by loading software built in the controller CPU 5 in advance. However, it is not possible to output the grayscale image data as it is. Thus, although it is not illustrated in the drawing, a transfer path connecting from the controller CPU 5 to the scanner image processing unit 2 is newly added to the configuration shown in FIG. 9, so that the output data from the expansion processing unit 5*a* can be transferred to the color-correction processing unit 2*d*.

In this case, the color-correction processing unit 2*d* converts the received grayscale image data in accordance with output characteristics of the black-and-white plotter unit mounted on a terminal thereof, and outputs the converted grayscale image data to the simple gradation processing unit 2*c*. In this case, the simple gradation processing unit 2*c* applies a gradation process to the grayscale image data received from the color-correction processing unit 2*d*, and generates, for example, black-and-white image data of 2 gradation levels (binary image data), and then accumulates the black-and-white image data in the RAM 7.

The black-and-white image data (black-and-white print data) stored in the RAM 7 is transferred to the output control unit 8*a* of the plotter image processing unit 8 by the controller CPU 5.

The output control unit 8*a* transfers the received black-and-white print data to the image writing unit 10 in synchronization with a print timing of the image writing unit 10. The image writing unit 10 records an image of the print data on a sheet, and discharges the sheet.

In the above example, when a result of color determination output from the automatic color determining unit 2*b* is not used, the controller CPU 5 is configured to ignore the result of the color determination. Alternatively, the controller CPU 5 can be configured to mask an interrupt signal output from the automatic color determining unit 2*b*.

Furthermore, in the above example relating to the link print operation, the parent apparatus MX1 and the child apparatus MX2 are directly connected to each other. The present invention can be applied to a case where the parent apparatus MX1 and the child apparatus MX2 are connected via a network.

According to the present embodiment, the controller image processing unit 3 and other units can be easily attached to and removed from the image forming apparatus. Therefore, it is easy to provide an image processing apparatus depending on user needs. Furthermore, when various image processing apparatuses having a different configuration from one another are provided, the same computer program for controlling the image processing apparatus (for example, the controller software 6*a*) can be used among the image processing apparatuses, or the computer program can be used with a slight modification among the image processing apparatuses. Therefore, it is possible to reduce a development burden.

Incidentally, the computer program for controlling the image processing apparatus according to the present embodiment (for example, the controller software 6*a*) is preliminarily built into a ROM or the like of the image processing apparatus.

Alternatively, the computer program can be recorded on a computer-readable recording medium, such as a compact disk ROM (CD-ROM), a flexible disk (FD), a compact disk recordable (CD-R), or a digital versatile disk (DVD), in an installable or executable file format.

Furthermore, the computer program can be stored on a computer connected to a network such as the Internet so that the computer program can be downloaded via the network. Moreover, the computer program can be provided or distributed via the network.

The computer program is composed of modules including elements for performing various processes. As actual hardware, the controller CPU 5 reads out the computer program from the RAM 7 or the like, and executes the computer program, whereby the elements are loaded on a main memory unit, i.e., the elements are created on the main memory unit.

According to one aspect of the present invention, various types of image processing apparatuses including different functions from one another can be easily configured.

Furthermore, according to another aspect of the present invention, types of image processing apparatuses can be easily increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus to which a scanner unit that reads an image of an original and either one of a color plotter unit that records a color image and a black-and-white plotter unit that records a black-and-white image are configured to be connected, the image processing apparatus comprising:

a scanner-characteristic correcting unit that converts image data read by the scanner unit into normalized image data to compensate for a characteristic of the scanner unit;

a first image processing unit that applies a first image processing on the normalized image data to generate image data to be output;

a color determining unit that determines whether the normalized image data is color image data or black-and-white image data; and an attaching and removing unit that can attach and remove a controller image processing unit that applies a second image processing on the normalized image data to generate image data to be output, wherein when the black-and-white plotter unit is connected to the image processing apparatus and the controller image processing unit is not attached, the first image processing unit generates binary image data of the image data by applying the first image processing on the normalized image data before a result of color determination of the image data by the color determining unit is output.

2. The image processing apparatus according to claim 1, wherein the controller image processing unit includes an input control unit that receives the normalized image data that is multivalue image data, an accumulation control unit that controls an accumulation of the image data input by the input control unit in an external storage unit, and a second image processing unit that applies the second image processing on the image data input by the input control unit or image data read out from the external storage unit, and when the black-and-white plotter unit is connected to the image processing apparatus, the first image processing unit generates grayscale image data of the image data by applying the first image processing on the normalized image data regardless of the result of the color determination, the image processing apparatus further comprises a control unit that causes the input control unit to input the normalized image data, the accumulation control unit to accumulate the image data input by the input control unit in the external storage unit, and the second image processing unit to generate black-and-white image data as the second image processing regardless of the result of the color determination.

3. The image processing apparatus according to claim 1, wherein a complexity of the first image processing is lower than that of the second image processing.

4. The image processing apparatus according to claim 2, wherein a complexity of the first image processing is lower than that of the second image processing.

5. The image processing apparatus according to claim 2, further comprising a communication unit that transfers image data to a second image processing apparatus, wherein when the second image processing apparatus includes the controller image processing unit and a black-and-white plotter unit is connected to the second image processing apparatus, the communication unit transfers the grayscale image data to the second image processing apparatus, and when the image processing apparatus operates as the second image processing apparatus, the second image processing unit converts received grayscale image data into black-and-white image data, and outputs the black-and-white image data connected black-and-white plotter unit.

6. The image processing apparatus according to claim 2, further comprising a communication unit that transfers image data to a second image processing apparatus, wherein when a black-and-white plotter unit is connected to the second image processing apparatus without the controller image processing unit and, the communication unit transfers the grayscale image data to the second image processing apparatus, and when the image processing apparatus operates as the second image processing apparatus, the first image processing unit converts received grayscale image data into black-and-white image data, and outputs the black-and-white image data to connected black-and-white plotter unit.

7. The image processing apparatus according to claim 5, wherein the controller image processing unit further includes a compression unit that compresses image data, and when the image processing apparatus operates as the second image processing apparatus, the controller image processing unit further includes an expansion unit that expands image data compressed by the compression unit.

8. A method of controlling an image processing apparatus to which a scanner unit that reads an image of an original and either one of a color plotter unit that records a color image and a black-and-white plotter unit that records a black-and-white image are configured to be connected, the method comprising:

converting image data read by the scanner unit into normalized image data to compensate for a characteristic of the scanner unit;

first image processing including applying a first image processing on the normalized image data to generate image data to be output;

determining whether the normalized image data is color image data or black-and-white image data; and attaching a controller image processing unit that applies a second image processing on the normalized image data to generate image data to be output in a removable manner, wherein when the black-and-white plotter unit is connected to the image processing apparatus and the controller image processing unit is not attached, the first image processing includes generating binary image data of the image data by applying the first image processing on the normalized image data before a result of color determination of the image data is output.

9. The method according to claim 8, further comprising controller image processing including the controller image processing unit receiving the normalized image data that is multivalue image data, accumulating received image data in an external storage unit, and second image processing including applying the second image processing on the received image data or image data read out from the external storage unit, and when the black-and-white plotter unit is connected to the image processing apparatus, the first image processing includes generating grayscale image data of the image data by applying the first image processing on the normalized image data regardless of the result of the color determination, the method further comprises controlling including a control unit causing the receiving to receive the normalized image data, the accumulating to accumulate the received image data in the external storage unit, and the second image processing to generate black-and-white image data as the second image processing regardless of the result of the color determination.

10. The method according to claim 9, further comprising transferring image data to a second image processing apparatus, wherein when the second image processing apparatus includes the controller image processing unit and a black-and-white plotter unit is connected to the second image processing apparatus, the transferring includes transferring the grayscale image data to the second image processing apparatus, and when the image processing apparatus operates as the second image processing apparatus, the second image processing includes converting received grayscale image data into black-and-white image data, and outputting the black-and-white image data to connected black-and-white plotter unit.

11. The method according to claim 9, further comprising transferring image data to a second image processing apparatus, wherein when method for the second image processing apparatus exclusively includes the converting, and the black-and-white plotter unit is connected to the second image processing apparatus, the transferring includes transferring the grayscale image data to the second image processing apparatus, and when the image processing apparatus operates as the second image processing apparatus, the first image processing includes converting received grayscale image data into black-and-white image data and outputting the black-and-white image data to connected black-and-white plotter unit.

12. A computer program product comprising a non-transitory computer-readable medium having computer-readable program codes embodied in the medium for implementing a method of controlling an image processing apparatus to which a scanner unit that reads an image of an original and either one of a color plotter unit that records a color image and a black-and-white plotter unit that records a black-and-white image are configured to be connected, the program codes when executed causing a computer to execute:

converting image data read by the scanner unit into normalized image data to compensate for a characteristic of the scanner unit;

first image processing including applying a first image processing on the normalized image data to generate image data to be output;

determining whether the normalized image data is color image data or black-and-white image data; and attaching a controller image processing unit that applies a second image processing on the normalized image data to generate image data to be output in a removable manner, wherein when the black-and-white plotter unit is connected to the image processing apparatus and the controller image processing unit is not attached, the first image processing includes generating binary image data of the image data by applying the first image processing on the normalized image data before a result of color determination of the image data is output.

* * * * *